United States Patent [19]
Brown

[11] 3,945,240
[45] Mar. 23, 1976

[54] DIFFUSION BONDING SEPARATOR

[75] Inventor: Bruce T. Brown, Riviera Beach, Fla.

[73] Assignee: United Technologies Corporation, Hartford, Conn.

[22] Filed: Oct. 16, 1972

[21] Appl. No.: 298,043

[52] U.S. Cl. .................... 72/462; 72/467; 249/134
[51] Int. Cl.² .................... B21D 37/01; B21J 13/00
[58] Field of Search............ 72/467, 462; 76/107 R; 164/273 R, 281, 82; 249/134

[56] References Cited
UNITED STATES PATENTS

| | | | |
|---|---|---|---|
| 3,200,630 | 8/1965 | Wilson | 72/254 |
| 3,422,663 | 1/1969 | James | 76/107 R |
| 3,490,516 | 1/1970 | Basche | 164/273 R |
| 3,658,979 | 4/1972 | Dunn | 164/82 |

Primary Examiner—C. W. Lanham
Assistant Examiner—Joseph A. Walkowski
Attorney, Agent, or Firm—Richard N. James

[57] ABSTRACT

A separator of solid boron nitride is utilized to prevent diffusion bonding between an alloy being worked at high temperature and the components of working apparatus.

4 Claims, 2 Drawing Figures

DIFFUSION BONDING SEPARATOR

BACKGROUND OF THE INVENTION

This invention relates in general to the working or fabrication of metals at high temperatures and, more particularly, to means for preventing metallurgical bonding between such metals and the working components of the fabrication equipment.

The problem of unwanted metallurgical bonding of alloys to pressing apparatus and other elements, such as the protective covering utilized around alloy powders in some instances, has long been recognized. Various compositions have been utilized in the past to minimize such bonding as described, for example, in the patent to Boucher et al. U.S. Pat. No. 3,380,917.

As processing temperatures rise, the potential for diffusion bonding typically becomes more acute. In forging processes such as that described in the patent to Moore et al. U.S. Pat. No. 3,519,503, a combination of high temperatures and hot dies, and a high ductility condition of the materials being forged, all tend to promote diffusion bonding between such materials and the working components of the forging press.

In an application copending herewith filed on May 10, 1971 for Forging Die Lubrication and assigned Ser. No. 141,530, the use of powdered boron nitride is suggested as one example of a suitable high temperature lubricant for forging operations. This lubricant minimizes the metallurgical bonding problem between the dies and the material being forged.

The use of lubricants in powder or paste form is not, however, the answer in some applications. First, powders are by their very nature susceptible to dislodgment due, for example, to a wiping action during handling or working and, in practice, reapplication of lubricant between working run is usually required on a periodic basis. The lubricant reapplication process may be particularly difficult where large heated components are involved.

Furthermore, in some applications where precise dimensional controls are required, the wiping action of the lubricant not only results in the scrubbing of lubricant from some areas but also in a buildup of lubricant in other areas. The net result is an inability to maintain a precise control of dimension where required. A lubricant buildup has, for example, been found to prevent the complete filling of a closed die cavity in the forging of components of complex contour. In another case where thin walled structures were being joined under pressure in a diffusion bonding operation between two flat platens, a lubricant buildup so interfered with the essential flatness of the platens that uneven deformation of the bonded members occurred.

SUMMARY OF THE INVENTION

The present invention contemplates the use of a solid boron nitride as the pressure applying member in metal working or forming apparatus.

DESCRIPTION OF THE PREFERRED EMBODIMENTS

Figure 1:
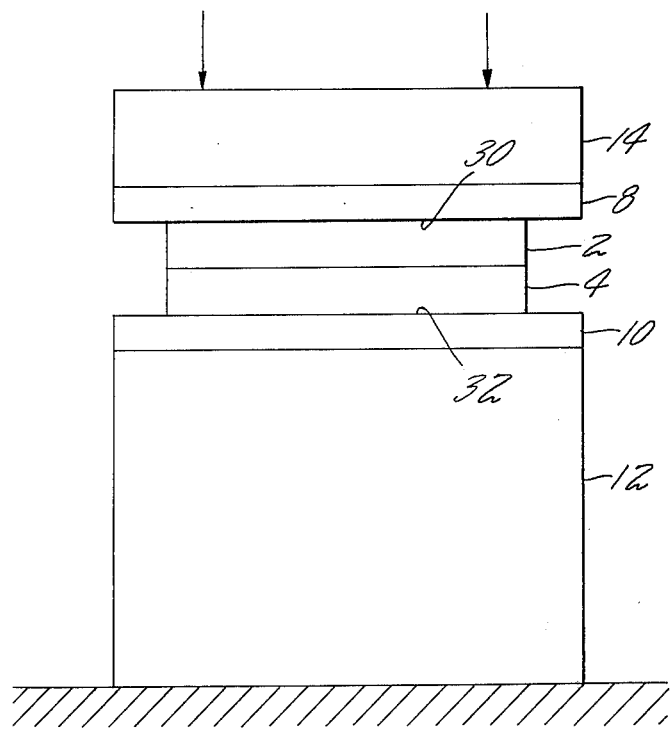
FIG. 1 is a simple schematic of pressing apparatus suitable for use in diffusion bonding operations.

Two representative types of metal fabricating or metal working apparatus are shown schematically in the drawings. FIG. 1 illustrates a simple stack such as has been used in diffusion bonding operations. Two components 2 and 4 to be diffusion bonded along the faying surfaces 6 are sandwiched between two flat platens 8 and 10 of solid boron nitride, which in this embodiment comprise the pressure applying surfaces. The platen 10 is supported on the base member 12 and pressure is applied to the parts to be bonded by the movable member 14.

Figure 2:
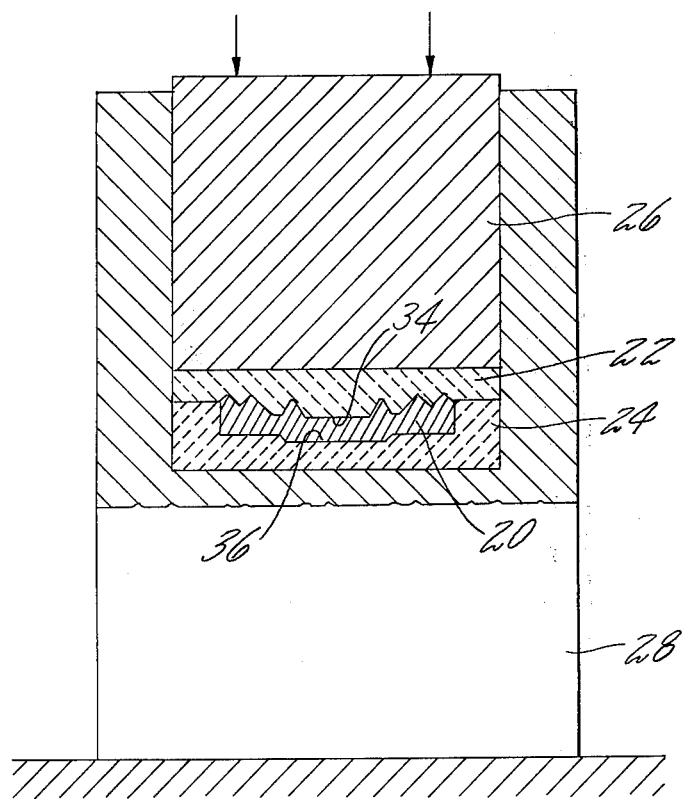
FIG. 2 is a simple schematic of forging equipment suitable for forming shaped parts in closed dies.

The forging press shown schematically in FIG. 2 is similar in overall function. In the forging operation an ingot is deformed and shaped into a component 20 between and in forging dies 22 and 24 which are formed of solid boron nitride. The closure force is exerted by the movable pressure-exerting member 26 into the base member 28.

Utilizing the techniques taught herein unwanted bonding is prevented between the part or parts being processed and the process equipment as, for example, at the junctures 30 and 32 of FIG. 1 and along die surfaces 34 and 36 of FIG. 2.

The basic problem in high temperature pressing operations is, as mentioned, the difficulties associated with a lubricant shift or buildup which prevent adequate dimensional control. This in turn would suggest that the pressing surfaces themselves must be made resistant to metallurgical bonding. Unfortunately, however, although the basic theory of problem solution was perhaps evident, no ready means of practical implementation appeared available, for those materials displaying the necessary lubricity did not appear to possess the necessary resistance to deformation or structural strength and vice versa.

There are a substantial number of materials that at first glance might appear suitable as bond separator materials for structural applications. The refractory oxides such as alumina, magnesia, beryllia and zirconia, for example, are known to be resistant to diffusion bonding to metals at high temperatures. Unfortunately such materials in solid form have proven to lack lubricity, thermal shock resistance or adequate strength and, for this reason, are unsatisfactory for such purposes. Hence, the need for a suitable solution to the metallurgical bonding problem has escaped the industry.

Applicant has now discovered that solid boron nitride has both the structural strength and lubricity to be used as the pressing surfaces in high temperature metal fabrication operations. Hot pressed, cast, or pyrolitic boron nitride are considered suitable. The superior and unique performance of boron nitride is illustrated in the following Table.

| Material Tested | Separator Performance Maximum Temperature (°F) | Maximum Pressure (PSI) | Results |
|---|---|---|---|
| 1. Green Nicrobraze Stop-off | 2000 | 3000 | Became very hard and bonded to metal surface. Acids, bases, and salts tested could not remove from the metal surface. Did separate from platens. |
| 2. Milk of Magnesia | 2000 | 3000 | Same as first except it turned black during cycle. |
| 3. Rockide-Zirconium Oxide | 2000 | 3000 | Bonded to both the sample and platens. |
| 4. Boron Nitride Powder | 2150 | 3000 | Worked well for unetched samples but shifted for the etched samples depressing surface into coolant passages. |
| 5. Solid Alumina Discs | 2150 | 3000 | Bonded to sample and cracked severely. |
| 6. Nickel Oxide on TD Nickel Sheet | 2150 | 3000 | Bonded to sample and could not be removed. |
| 7. Sodium Dichromate Coated TD Nickel | 2100 | 2000 | Bonded to sample over approximately 50% of the surface. |
| 8. Magnesium Smoke | 2150 | 2000 | Separated well from sample and platens but could not be applied evenly. Some surface depression. |
| 9. Solid Zirconia Discs | 2150 | 2000 | Partially bonded to the sample and cracked. |
| 10. Solid Ceramic Glass Discs | 2150 | 2000 | Shattered and melted to the platen. |
| 11. Solid Beryllia Discs | 2150 | 2000 | Partially bonded to the sample and cracked. |
| Solid Boron Nitride Discs | 2150 | 2000 | Separated well and was reusable with a minimum of rework. |

In addition to its lubricity qualifications in the diffusion bond separator sense, it will be recognized that such property also provides the capability of reducing die wear. For this purpose alone it may be considered for use in solid form in pressing apparatus possibly as die inserts in areas particularly susceptible to heavy die wear.

Having thus described this invention what is claimed is:

1. Metal deformation apparatus which comprises:
at least one movable, pressure-exerting member; and
a pressure-exerting surface on said member for contact with a solid metal article being processed, said surface consisting essentially of solid boron nitride of substantially full density.

2. Apparatus according to claim 1 where:
the apparatus is a forging press.

3. Apparatus according to claim 2 wherein:
the pressure-exerting surface is formed in the shape of a die cavity.

4. Forging dies consisting essentially of cast boron nitride.

* * * * *